(12) United States Patent
Vilkamo et al.

(10) Patent No.: US 11,606,661 B2
(45) Date of Patent: Mar. 14, 2023

(54) RECORDING AND RENDERING SPATIAL AUDIO SIGNALS

(71) Applicant: Nokia Technologies Oy, Espoo (FI)

(72) Inventors: Juha Vilkamo, Helsinki (FI); Mikko-Ville Laitinen, Helsinki (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 16/648,324

(22) PCT Filed: Sep. 18, 2018

(86) PCT No.: PCT/FI2018/050674
§ 371 (c)(1),
(2) Date: Mar. 18, 2020

(87) PCT Pub. No.: WO2019/063877
PCT Pub. Date: Apr. 4, 2019

(65) Prior Publication Data
US 2020/0260206 A1 Aug. 13, 2020

(30) Foreign Application Priority Data

Sep. 29, 2017 (GB) ..................... 1715863

(51) Int. Cl.
*H04S 7/00* (2006.01)
*G06F 3/01* (2006.01)
*G06F 3/16* (2006.01)
*H04R 3/00* (2006.01)
*H04R 5/027* (2006.01)
*H04R 5/04* (2006.01)

(52) U.S. Cl.
CPC .............. *H04S 7/302* (2013.01); *G06F 3/011* (2013.01); *G06F 3/017* (2013.01); *G06F 3/16* (2013.01);
(Continued)

(58) Field of Classification Search
CPC .. H04S 7/302; H04S 2400/01; H04S 2400/11; H04S 2420/11; G06F 3/011;
(Continued)

(56) References Cited

U.S. PATENT DOCUMENTS 10,803,642 B2 * 10/2020 DiVerdi ................ G06F 3/0346
2003/0035553 A1 * 2/2003 Baumgarte ............... H04S 3/00
381/94.2

(Continued)

FOREIGN PATENT DOCUMENTS

WO WO 2017/085140 A1 5/2017

OTHER PUBLICATIONS

Myung-Suk, S. et al., "Personal 3D Audio System with Loudspeakers." 2010 IEEE International Conference, Piscataway, NJ, USA, Jul. 19, 2010, 4pgs.
(Continued)

*Primary Examiner* — Andrew L Sniezek
(74) *Attorney, Agent, or Firm* — Harrington & Smith

(57) ABSTRACT

Examples of the disclosure relate to a method, apparatus and computer program, the method including: obtaining audio signals wherein the audio signals represent spatial sound and can be used to render spatial audio using linear methods; obtaining spatial metadata corresponding to the spatial sound represented by the audio signals; and associating the spatial metadata with the obtained audio signals so that in a first rendering context the obtained audio signals can be rendered without using the spatial metadata and in a second rendering context the obtained audio signals can be rendered with using the spatial metadata.

19 Claims, 7 Drawing Sheets

Figure 1:
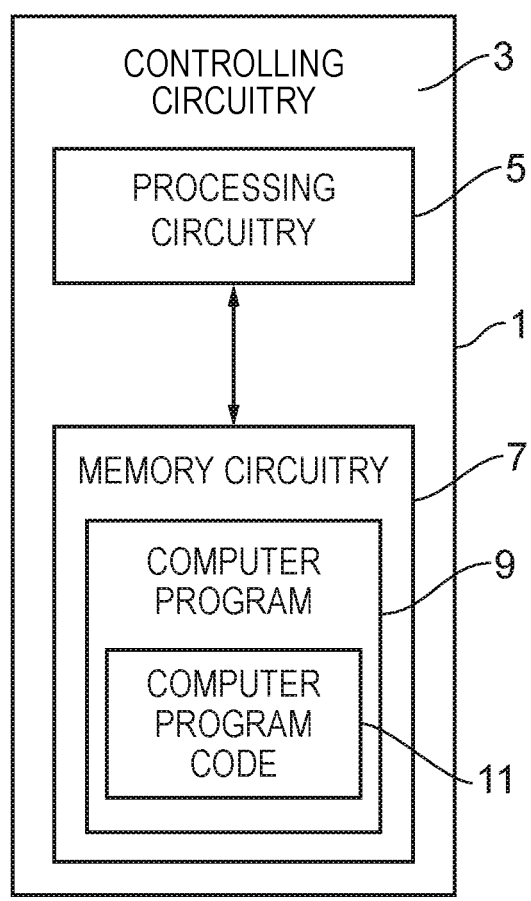

(52) U.S. Cl.
CPC ............. *H04R 3/005* (2013.01); *H04R 5/027* (2013.01); *H04R 5/04* (2013.01); *H04S 2400/01* (2013.01); *H04S 2400/11* (2013.01); *H04S 2420/11* (2013.01)

(58) Field of Classification Search
CPC ........... G06F 3/017; G06F 3/16; H04R 3/005; H04R 5/027; H04R 5/04
See application file for complete search history.

(56) References Cited

U.S. PATENT DOCUMENTS

| | | |
|---|---|---|
| 2013/0142341 A1 | 6/2013 | Del Galdo et al. ............. 381/23 |
| 2014/0016802 A1 | 1/2014 | Sen ............................... 381/307 |
| 2016/0227337 A1 | 8/2016 | Goodwin et al. |
| 2016/0241980 A1 | 8/2016 | Najaf-Zadeh et al. |
| 2017/0140764 A1 | 5/2017 | Wuebbolt et al. |
| 2017/0180905 A1 | 6/2017 | Purnhagen et al. |
| 2017/0194014 A1 | 7/2017 | Kim |
| 2018/0091917 A1* | 3/2018 | Chon ...................... H04S 7/303 |

OTHER PUBLICATIONS

Kowalczyk, K. et al., "Parametric Spatial Sound Processing: A Flexible and Efficient Solution to Sound Scene Acquisition, Modification, and Reproduction." IEEE Signal Processing Magazine, vol. 32, No. 2, Mar. 1, 2015, 12 pgs.

* cited by examiner

RECORDING AND RENDERING SPATIAL AUDIO SIGNALS

CROSS REFERENCE TO RELATED APPLICATION

This patent application is a U.S. National Stage application of International Patent Application Number PCT/FI2018/050674 filed Sep. 18, 2018, which is hereby incorporated by reference in its entirety, and claims priority to GB 1715863.5 filed Sep. 29, 2017.

TECHNOLOGICAL FIELD

Examples of the disclosure relate to recording and rendering spatial audio signals. In particular, they relate to recording and rendering spatial audio signals wherein the spatial audio signals represent spatial sound and can be used to render spatial audio using linear methods

BACKGROUND

Audio capture devices may be used to record a spatial audio signal. The spatial audio signal may comprise a representation of a sound space. The spatial audio signal may then be rendered by an audio rendering device such as headphones or loudspeakers. It is useful to enable recording and rendering of audio signals which provides a high quality user experience. For example, it is useful to enable the rendered audio to be adjusted as the user moves relative to the sound space. It may also be useful to improve the spatial accuracy of the rendered spatial audio.

BRIEF SUMMARY

According to various, but not necessarily all, examples of the disclosure, there may be provided a method comprising: obtaining audio signals wherein the audio signals represent spatial sound and can be used to render spatial audio using linear methods; obtaining spatial metadata corresponding to the spatial sound represented by the audio signals; and associating the spatial metadata with the obtained audio signals so that in a first rendering context the obtained audio signals can be rendered without using the spatial metadata and in a second rendering context the obtained audio signals can be rendered with using the spatial metadata.

The spatial metadata may be determined in frequency bands.

The spatial metadata may comprise information indicating how the energy levels in one or more frequency sub-bands of the obtained audio signal have been modified.

The spatial metadata may comprise information relating to the spatial properties of a sound space represented by the obtained audio signals.

The spatial metadata may comprise at least one of: distance parameters, direction parameters, energy ratio parameters.

The obtained audio signals may use spherical harmonics to enable spatial information to be rendered.

The obtained audio signals may comprise Ambisonic signals.

The obtained audio signals may be obtained from a plurality of spatially separated microphones.

Associating the spatial metadata with the obtained audio signal may comprise transmitting the spatial metadata and the obtained audio signal to a rendering device.

Associating the spatial metadata with the obtained audio signal may comprise storing the spatial metadata with the obtained audio signal.

The rendering context may comprise one or more of; the type of rendering device being used, movement of the user, the spatial accuracy required during rendering.

The method may comprise using the spatial metadata to process the obtained audio signals so as to adjust the rendered audio in response to movement of the user.

The method may comprise using the spatial metadata to process the obtained audio signals so as to increase the spatial accuracy of the rendered audio signals.

According to various, but not necessarily all, examples of the disclosure, there may be provided an apparatus comprising: processing circuitry; and memory circuitry including computer program code, the memory circuitry and the computer program code configured to, with the processing circuitry, enable the apparatus to: obtain audio signals wherein the audio signals represent spatial sound and can be used to render spatial audio using linear methods; obtain spatial metadata corresponding to the spatial sound represented by the audio signals; and associate the spatial metadata with the obtained audio signals so that in a first rendering context the obtained audio signals can be rendered without using the spatial metadata and in a second rendering context the obtained audio signals can be rendered with using the spatial metadata.

The spatial metadata may be determined in frequency bands.

The spatial metadata may comprise information indicating how the energy levels in one or more frequency sub-bands of the obtained audio signal have been modified.

The spatial metadata may comprise information relating to the spatial properties of a sound space represented by the obtained audio signals.

The spatial metadata may comprise at least one of: distance parameters, direction parameters, energy ratio parameters.

The obtained audio signals may use spherical harmonics to enable spatial information to be rendered.

The obtained audio signals may comprise Ambisonic signals.

The obtained audio signals may be obtained from a plurality of spatially separated microphones.

Associating the spatial metadata with the obtained audio signal may comprise transmitting the spatial metadata and the obtained audio signal to a rendering device.

Associating the spatial metadata with the obtained audio signal may comprise storing the spatial metadata with the obtained audio signal.

The rendering context may comprise one or more of; the type of rendering device being used, movement of the user, the spatial accuracy required during rendering.

The processing circuitry and the memory circuitry may be configured to use the spatial metadata to process the obtained audio signals so as to adjust the rendered audio in response to movement of the user.

The processing circuitry and the memory circuitry may be configured to use the spatial metadata to process the obtained audio signals so as to increase the spatial accuracy of the rendered audio signals.

According to various, but not necessarily all, examples of the disclosure, there may be provided an apparatus comprising: means for obtaining audio signals wherein the audio signals represent spatial sound and can be used to render spatial audio using linear methods; means for obtaining spatial metadata corresponding to the spatial sound represented by the audio signals; and means for associating the spatial metadata with the obtained audio signals so that in a first rendering context the obtained audio signals can be rendered without using the spatial metadata and in a second rendering context the obtained audio signals can be rendered with using the spatial metadata.

According to various, but not necessarily all, examples of the disclosure, there may be provided an audio rendering device comprising an apparatus as described above and at least one audio output device.

According to various, but not necessarily all, examples of the disclosure, there may be provided a computer program comprising computer program instructions that, when executed by processing circuitry, enable: obtaining audio signals wherein the audio signals represent spatial sound and can be used to render spatial audio using linear methods; obtaining spatial metadata corresponding to the spatial sound represented by the audio signals; and associating the spatial metadata with the obtained audio signals so that in a first rendering context the obtained audio signals can be rendered without using the spatial metadata and in a second rendering context the obtained audio signals can be rendered with using the spatial metadata.

According to various, but not necessarily all, examples of the disclosure, there may be provided a computer program comprising program instructions for causing a computer to perform any of the methods described above.

According to various, but not necessarily all, embodiments of the invention there is provided examples as claimed in the appended claims.

BRIEF DESCRIPTION

Figure 2:
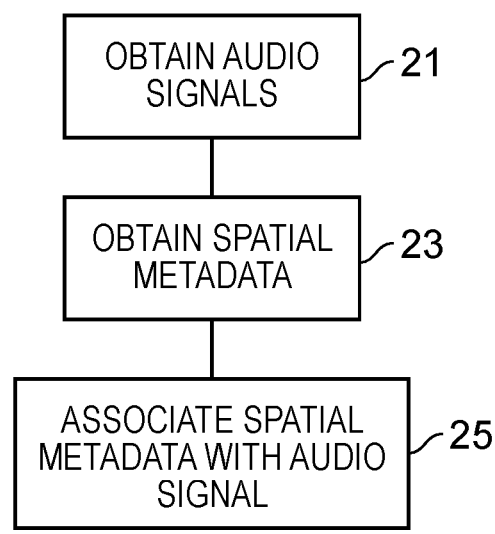
Figure 3:
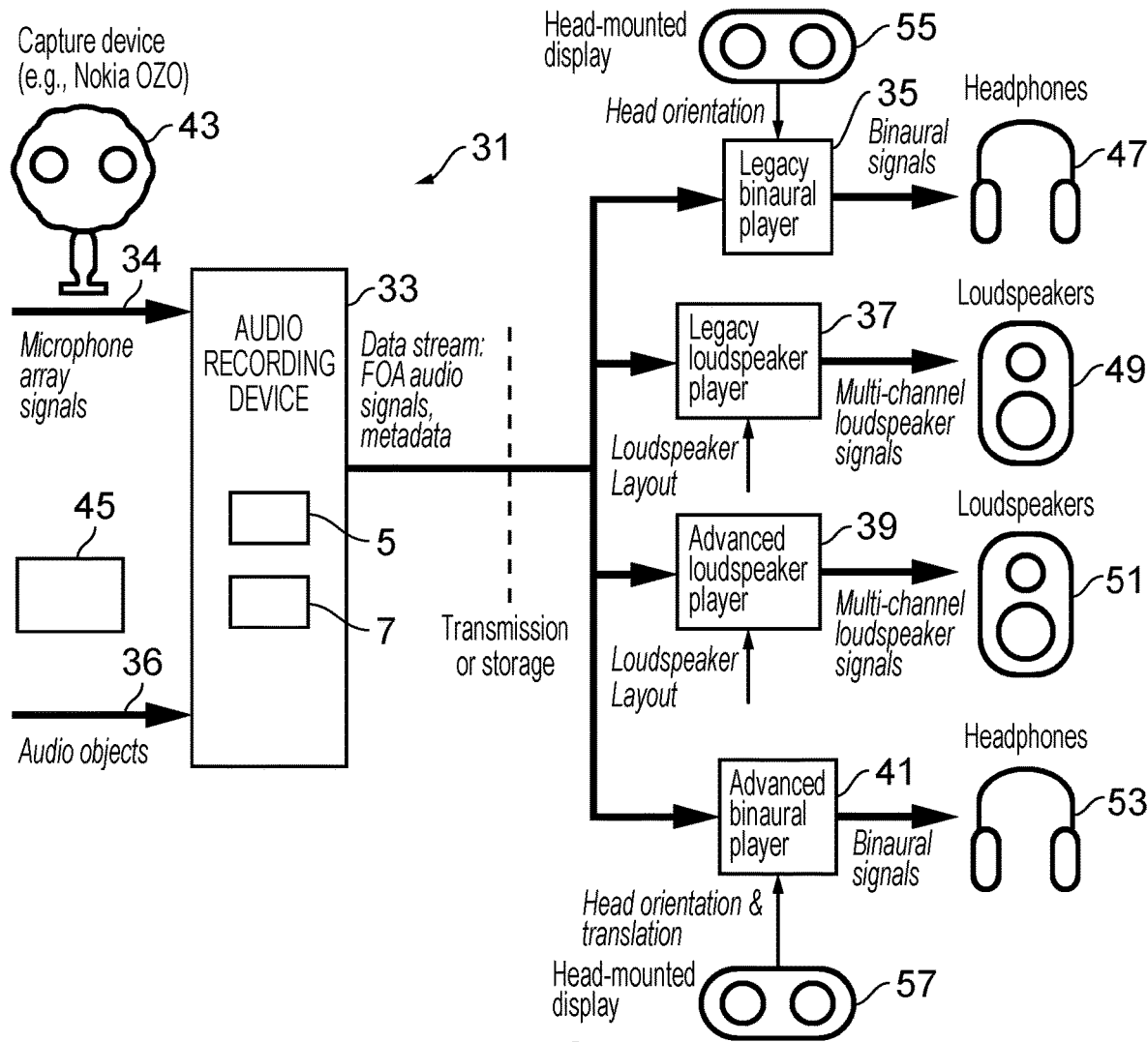
Figure 4:
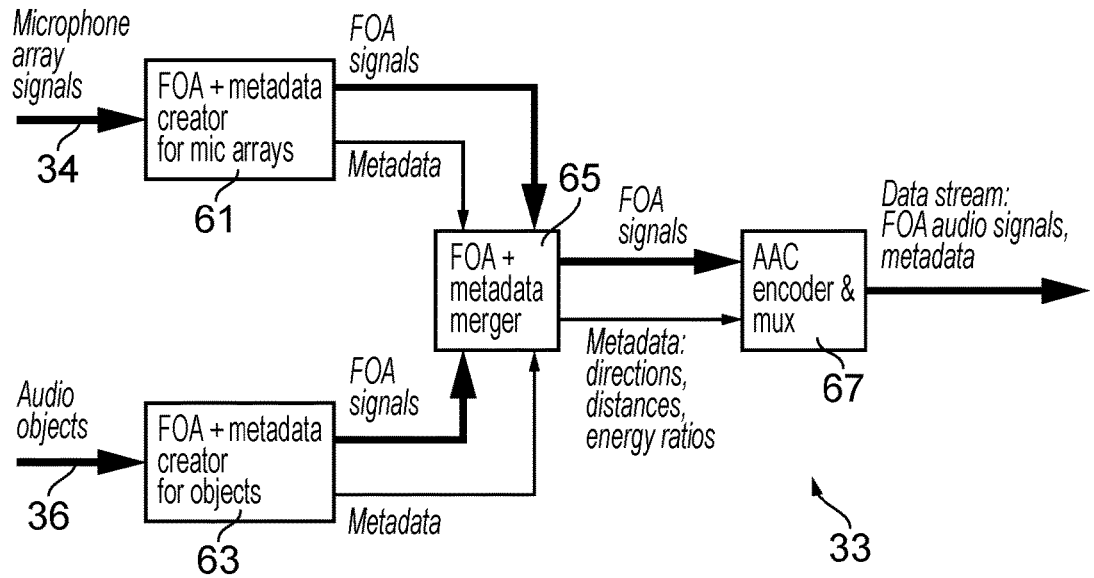
Figure 5:
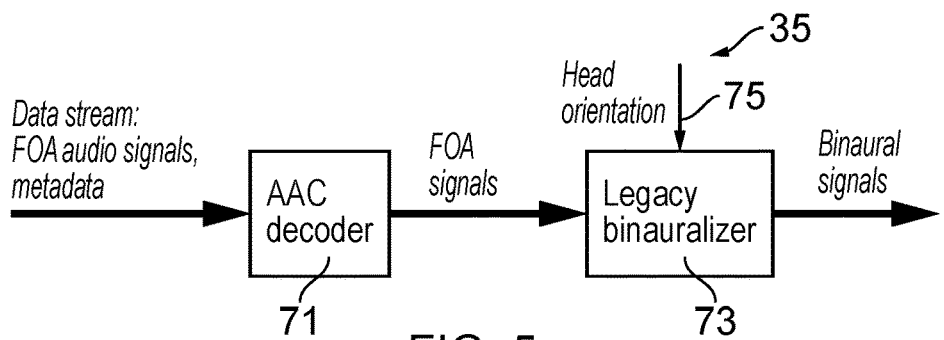
Figure 6:
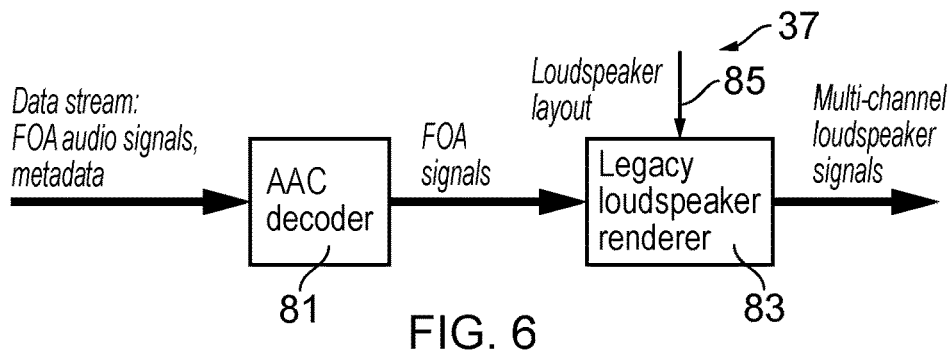
Figure 7:
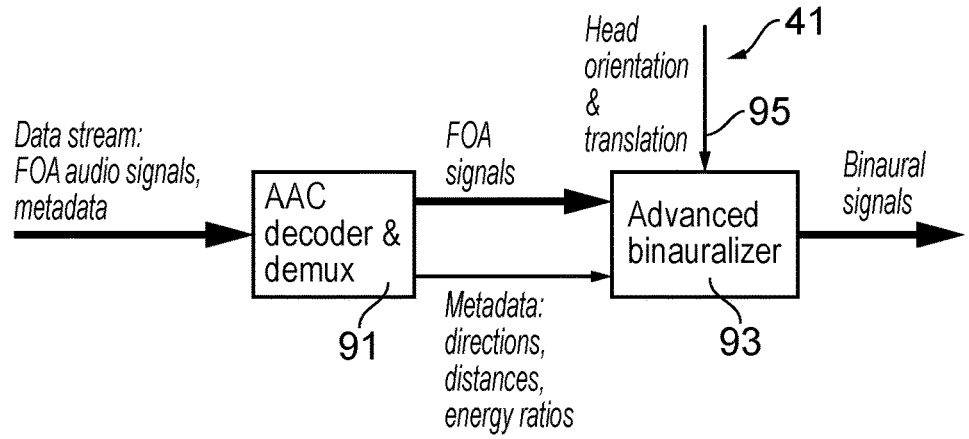
Figure 8:
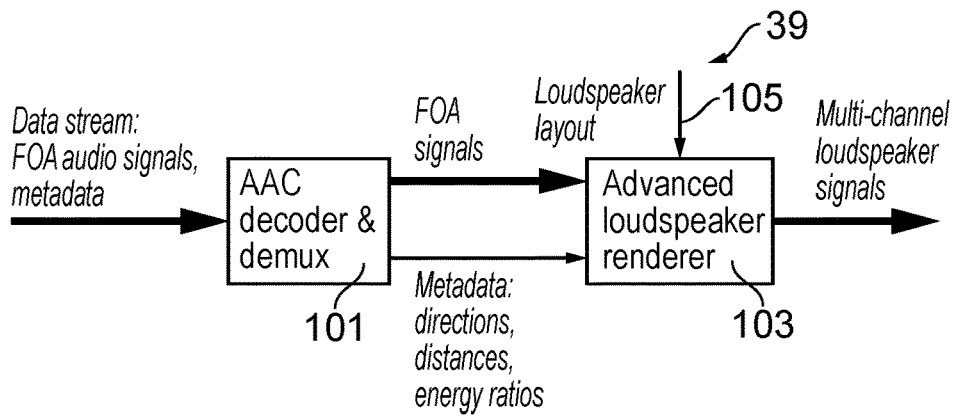
Figure 9:
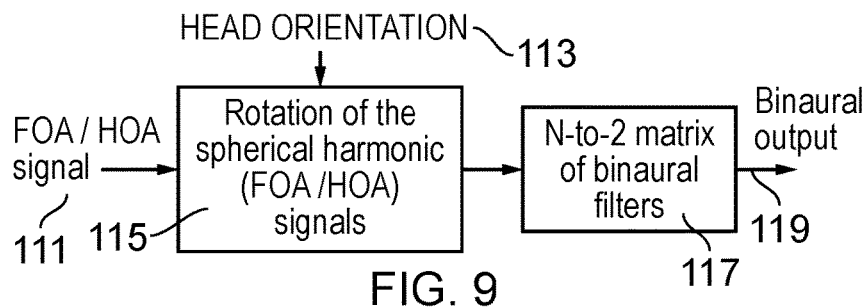
Figure 10:
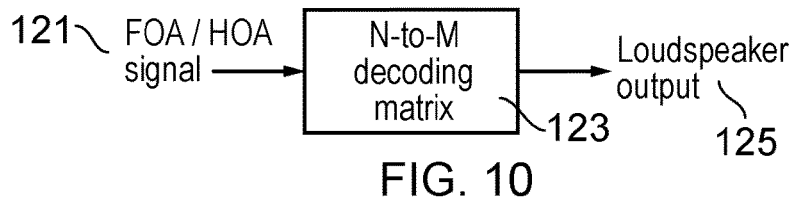
Figure 11:
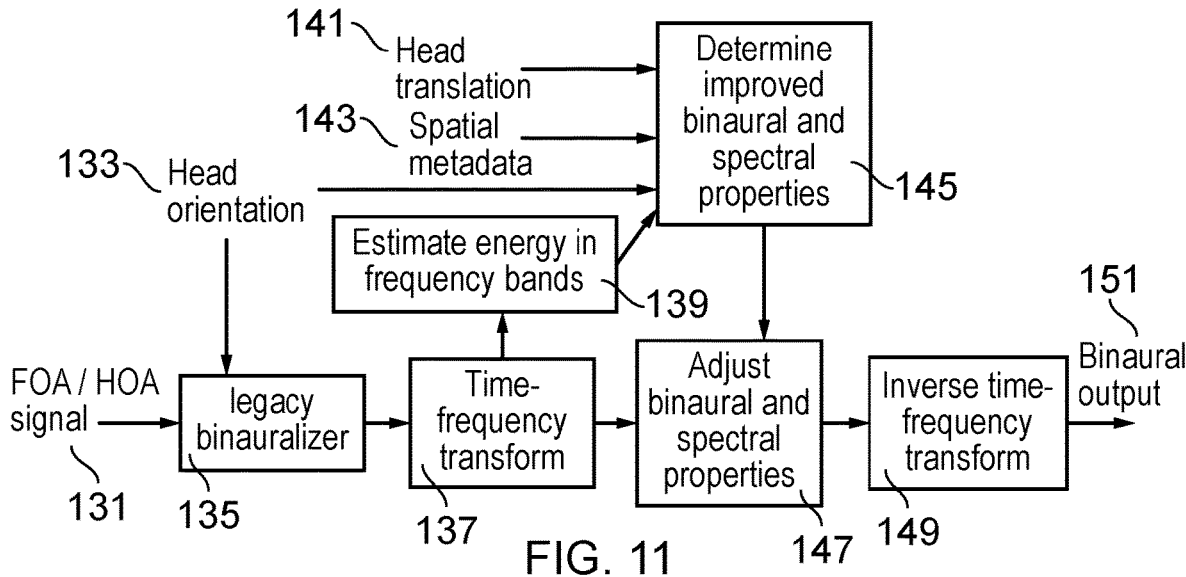
Figure 12:
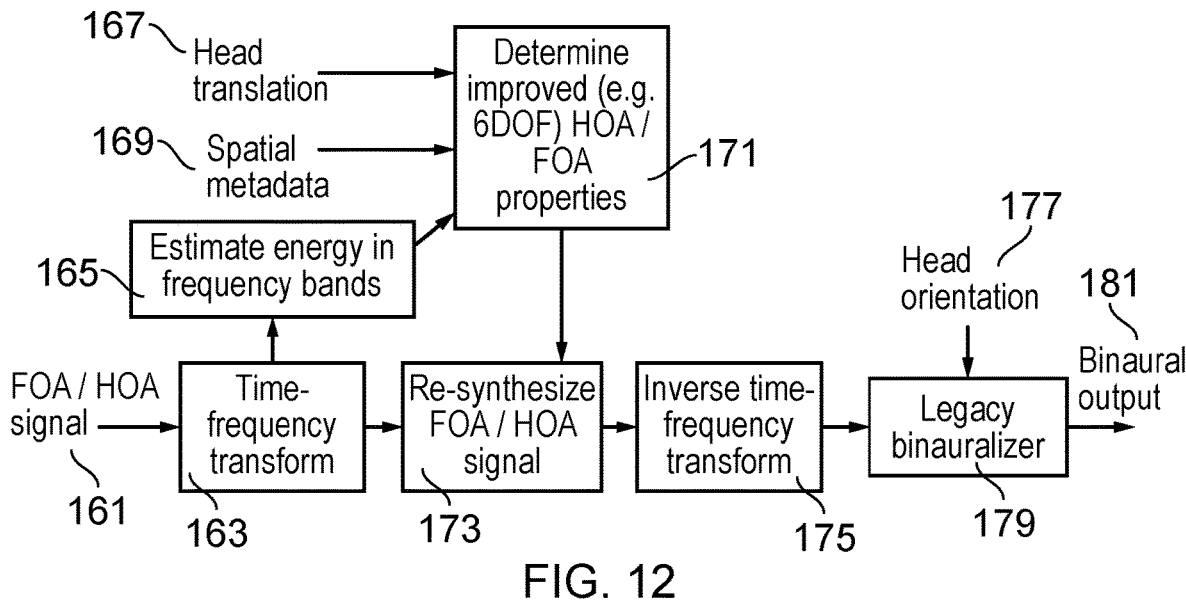
Figure 13:
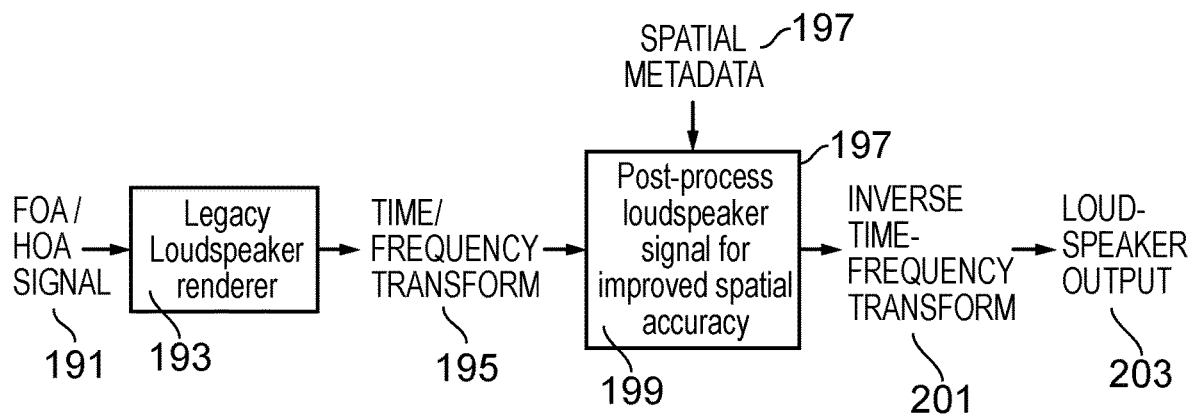
Figure 14:
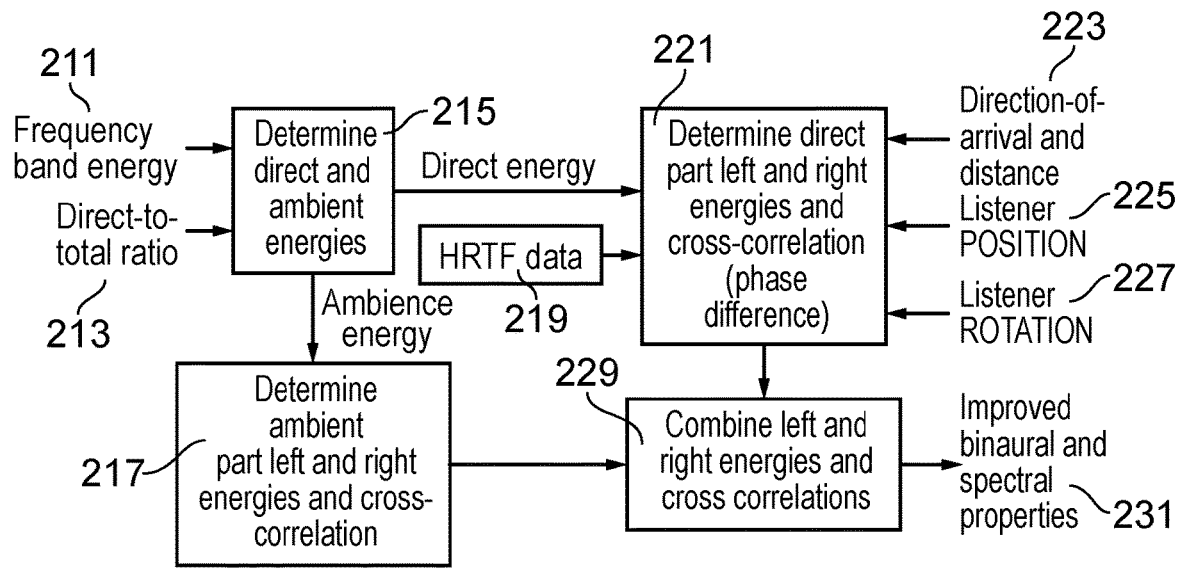
Figure 15:
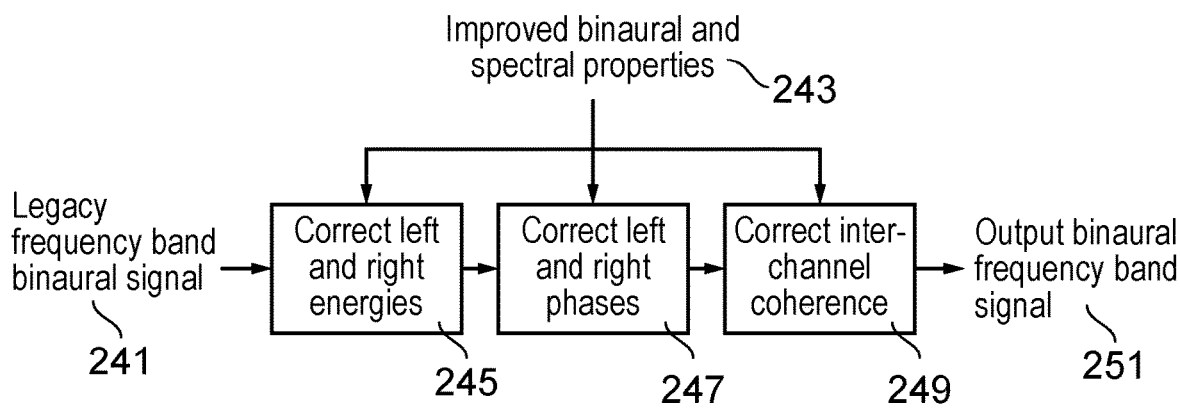
Figure 16:
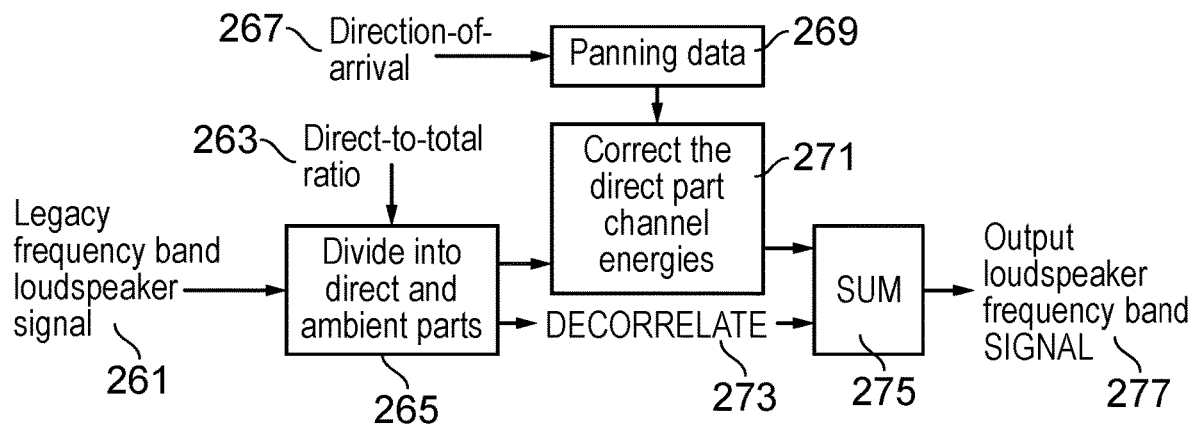
Figure 17:
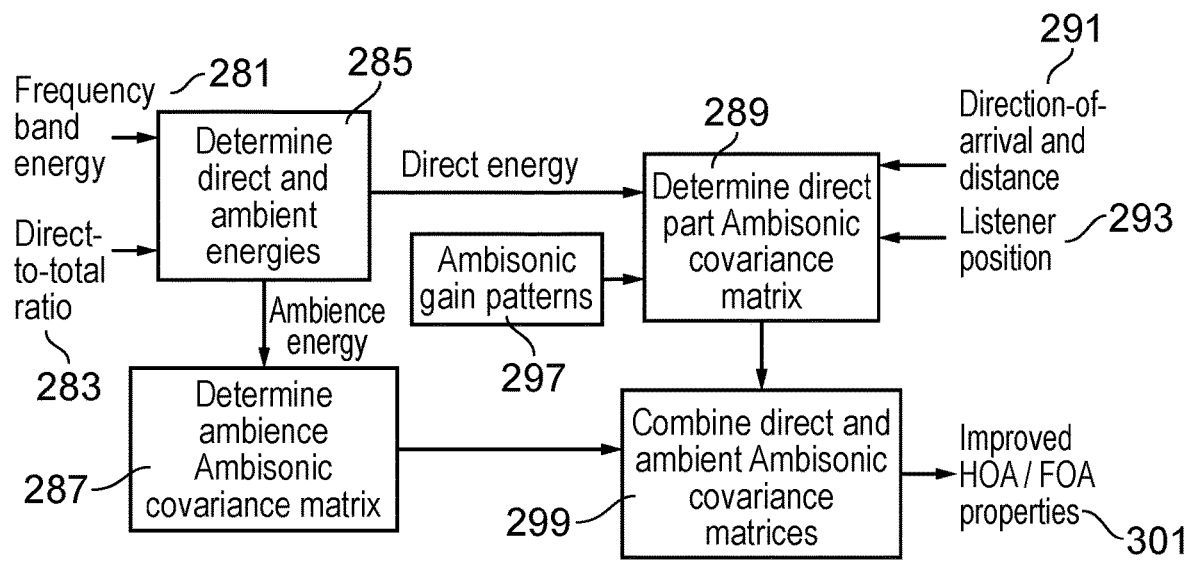
Figure 18:
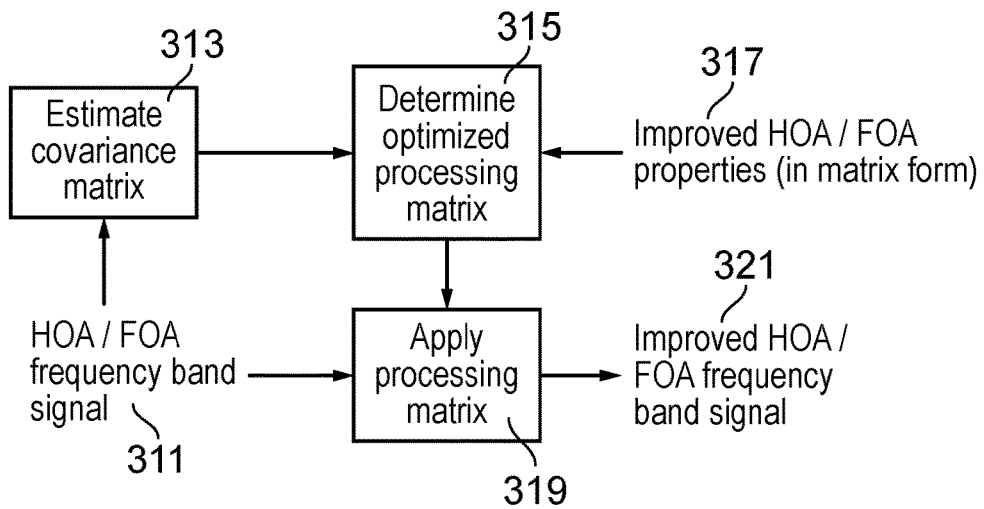

For a better understanding of various examples that are useful for understanding the detailed description, reference will now be made by way of example only to the accompanying drawings in which:

FIG. 1 illustrates an apparatus;
FIG. 2 illustrates a method;
FIG. 3 illustrates a system;
FIG. 4 illustrates an audio recording device;
FIG. 5 illustrates a legacy binaural player;
FIG. 6 illustrates a legacy loudspeaker player;
FIG. 7 illustrates an advanced binaural player;
FIG. 8 illustrates an advanced loudspeaker;
FIG. 9 illustrates a method that may be performed by a legacy binaural player;
FIG. 10 illustrates a method that may be performed by a legacy loudspeaker player;
FIG. 11 illustrates a method that may be performed by an advanced binaural player;
FIG. 12 illustrates another method that may be performed by an advanced binaural player;
FIG. 13 illustrates a method that may be performed by an advanced loudspeaker player;
FIG. 14 illustrates a method of determining improved binaural and spectral properties in a frequency band;
FIG. 15 illustrates a method of adjusting binaural and spectral properties in a frequency band;
FIG. 16 illustrates a method of post-processing loudspeaker signals;
FIG. 17 illustrates a method of determining first order and higher order audio signal properties in a frequency band; and
FIG. 18 illustrates a method of resynthesizing higher order and first order audio signals.

DETAILED DESCRIPTION

The Figures illustrate methods and apparatus 1 which may be used for recording and rendering spatial audio. The example methods and apparatus use audio signals which represent spatial sound and can be used to render spatial audio using linear methods. Examples of such audio signals may be Ambisonics or variations of Ambisonics. In examples of the disclosure spatial metadata corresponding to the spatial sound represented by the audio signal is obtained. This spatial metadata can then be used, by compatible rendering devices, when the audio signals are being rendered to improve the rendered spatial audio.

FIG. 1 schematically illustrates an apparatus 1 according to examples of the disclosure. The apparatus 1 illustrated in FIG. 1 may be a chip or a chip-set. In some examples the apparatus 1 may be provided within devices such as audio capture devices and/or audio rendering devices. Examples of audio capture devices and audio rendering devices are shown in the system 31 of FIG. 3.

The apparatus 1 comprises controlling circuitry 3. The controlling circuitry 3 may provide means for controlling an electronic device such as an audio rendering device. The controlling circuitry 3 may also provide means for performing the methods or at least part of the methods of examples of the disclosure.

The apparatus 1 comprises processing circuitry 5 and memory circuitry 7. The processing circuitry 5 may be configured to read from and write to the memory circuitry 7. The processing circuitry 5 may comprise one or more processors. The processing circuitry 5 may also comprise an output interface via which data and/or commands are output by the processing circuitry 5 and an input interface via which data and/or commands are input to the processing circuitry 5.

The memory circuitry 7 may be configured to store a computer program 9 comprising computer program instructions (computer program code 11) that controls the operation of the apparatus 1 when loaded into processing circuitry 5. The computer program instructions, of the computer program 9, provide the logic and routines that enable the apparatus 1 to perform the example methods illustrated in the Figures. The processing circuitry 5 by reading the memory circuitry 7 is able to load and execute the computer program 9.

The computer program 9 may arrive at the apparatus 1 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), or an article of manufacture that tangibly embodies the computer program. The delivery mechanism may be a signal configured to reliably transfer the computer program 9. The apparatus may propagate or transmit the computer program 9 as a computer data signal. In some examples the computer program code 11 may be transmitted to the apparatus 1 using a wireless protocol such as Bluetooth, Bluetooth Low Energy, Bluetooth Smart, 6LoWPan (IP$_v$6 over low power personal area networks) ZigBee, ANT+, near field communication (NFC), Radio frequency identification, wireless local area network (wireless LAN) or any other suitable protocol.

Although the memory circuitry 7 is illustrated as a single component in the figures it is to be appreciated that it may be implemented as one or more separate components some or all of which may be integrated/removable and/or may provide permanent/semi-permanent/dynamic/cached storage.

Although the processing circuitry 5 is illustrated as a single component in the figures it is to be appreciated that it may be implemented as one or more separate components some or all of which may be integrated/removable.

References to "computer-readable storage medium", "computer program product", "tangibly embodied computer program" etc. or a "controller", "computer", "processor" etc. should be understood to encompass not only computers having different architectures such as single/multi-processor architectures, Reduced Instruction Set Computing (RISC) and sequential (Von Neumann)/parallel architectures but also specialized circuits such as field-programmable gate arrays (FPGA), application-specific integrated circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

FIG. 2 illustrates a method which may be implemented using apparatus 1 as described above.

The method comprises, at block 21, obtaining audio signals wherein the audio signals represent spatial sound and can be used to render spatial audio using linear methods. At block 23 the method comprises obtaining spatial metadata corresponding to the spatial sound represented by the audio signals. And at block 25 the method comprises associating the spatial metadata with the obtained audio signal. The spatial metadata is assigned with the audio signal so that in a first rendering context the obtained audio signals can be rendered without using the spatial metadata and in a second rendering context the obtained audio signals can be rendered with using the spatial metadata.

In some examples the rendering context could comprise the type of rendering device that is being used. For instance a first rendering context could be using a legacy rendering device which might not be capable of processing the obtained audio signals using the spatial metadata. The second rendering context could be using an advanced rendering device which is capable of processing the obtained audio signals using the spatial metadata. This may enable the advanced rendering device to render an improved spatial audio signal.

In some examples the rendering context may comprise whether or not a user has moved. The movement of the user could comprise movement in six degrees of freedom. For example, it may comprise the user rotating or tilting their head about any three mutually orthogonal axis. It may also comprise components of lateral movement along those three orthogonal axis. In such examples the spatial metadata enables the obtained audio signals to be modified to take into account the movement of the user.

In some examples the rendering context may comprise the spatial accuracy required during rendering. In some cases the spatial audio provided by the obtained audio signals may be sufficient. In such cases the obtained audio signals may be rendered without using the spatial metadata so as to optimise the processing requirements. In other cases the user might prefer to hear spatial audio with a higher level of accuracy. In such cases the obtained audio signals may be rendered with using the spatial metadata.

Further details of the apparatus and methods are described below with reference to the accompanying Figures.

FIG. 3 illustrates a system 31 which may be used to implement methods according to examples of the disclosure. The system 31 comprises a recording device 33 and a plurality of audio rendering devices 35, 37, 39, 41. The different audio rendering devices 35, 37, 39, 41 may provide different rendering contexts for the audio signals. For instance a legacy rendering device 35, 37 may provide a first rendering context and an advanced rendering device 39, 41 may provide a second rendering context.

The audio recording device 33 comprises processing circuitry 5 and memory circuitry 7 which may be as described above. The audio recording device 33 may be arranged to receive a plurality of audio input signals 34 from a plurality of microphones and/or or audio object signals 36 and/or any other suitable type of audio input signals. The microphones may be spatially distributed so that the audio signals represent spatial sound.

In the example system of FIG. 3 two different types of audio input signals 34, 36 are shown. It is to be appreciated that other types of audio input signals could be used in other examples of the disclosure.

The first type of audio signals 34 comprise signals from a microphone array 43. The microphones within the microphone array 43 may be arranged within the array so that they can enable spatial sound to be recorded covering 360°. In the particular example of FIG. 3 the microphone array 43 is provided within an OZO device. The OZO device also comprises a plurality of cameras which are arranged to capture panoramic images corresponding to the spatial sound. It is to be appreciated that other types of devices comprising microphone arrays could be used in other examples of the disclosure.

The second type of audio signals 36 comprise audio object signals. The audio object signals could represent an audio object within a sound space. The audio object signals 36 could be received from a spatial audio mixer 45 or any other suitable device. The audio object signals 36 may comprise audio signals obtained by one or more microphones, audio signals that may be stored in the spatial audio mixer 45 or any other suitable type of audio object signals.

The audio input signals 34, 36 are provided to the audio recording device 33. The processing circuitry 5 within the audio recording device 33 is configured to convert the audio input signals to an audio signal which represents spatial sound and can be used to render spatial audio using linear methods. The audio signal may use spherical harmonics to enable spatial information to be rendered. In some examples the audio signals may comprise Ambisonics signals or variations of Ambisonics signals. In some examples the audio signals may comprises first order Ambisonics (FOA) signals and/or higher order Ambisonics (HOA) signals.

The processing circuitry 5 within the audio recording device 33 is also configured to use the audio input signal 34, 36 to obtain spatial metadata. The spatial metadata corresponds to the spatial sound represented by the audio signals. The spatial metadata comprises information relating to the spatial properties of the sound space recorded by the microphones. The spatial metadata may be determined in frequency bands. The spatial metadata may comprise information such as the directions, distances or direct-to-total energy ratios for each of the frequency bands in the signal.

The audio processing device 33 may associate the spatial metadata with the audio signals. The audio processing device 33 may associate the spatial metadata with the audio signal by storing the spatial metadata with the obtained audio signal. The spatial metadata and the obtained audio signal may be stored in the memory circuitry 7 of the audio processing device.

In some examples the audio processing device 33 may associate the spatial metadata with the audio signal by transmitting the spatial metadata and the obtained audio signal. The spatial metadata and the audio signal could be transmitted to one or more rendering devices 35, 37, 39, 41. The spatial metadata may be embedded within the audio signal before the audio signal is transmitted.

The audio rendering devices 35, 37, 39, 41 may be any devices which are arranged to receive the obtained audio input signals and convert these to audible output signals. The audible output signal may be a spatial signal which enables a user to perceive the spatial properties of the sound scene captured by the plurality of microphones and/or the spatial audio mixer 45.

In the example system of FIG. 3 the first audio rendering device 35 comprises a legacy binaural player 35. The legacy binaural player 35 enables binaural signals to be obtained from the received audio signals. The binaural signals are rendered to audible signals by a set of headphones 47 or any other suitable device.

In some examples the headphones could be mounted within or coupled to a head mounted display 55. This may enable the audible signals to be used in mediated reality applications such as virtual reality or mediated reality applications. In such examples the orientation of the user's head may be tracked. If it is detected that the user has rotated their head the binaural signals would then be adjusted so that the user perceives the spatial properties corresponding to the new orientation of their head.

In the legacy binaural player 35 spatial metadata is not used to obtain the binaural signals by the legacy binaural player 35. This ensures that the obtained audio signals used in examples of the disclosure are compatible with legacy devices.

The second audio rendering device 37 comprises a legacy loudspeaker player 37. The legacy loudspeaker player 37 enables multi-channel loudspeaker signals to be obtained from the received audio signals. The multi-channel loudspeaker signals are rendered to audible signals by one or more loudspeakers 49 or any other suitable devices.

The legacy loudspeaker player 37 receives information indicative of the layout of the loudspeakers 49. This information could comprise the relative positions of the one or more loudspeakers 49 and any other suitable information. This information may be used to ensure that the spatial properties of the audio signal can be recreated by the loudspeakers 49.

In the legacy loudspeaker player 37 spatial metadata is not used to obtain the multi-channel loudspeaker signals by the legacy loudspeaker player 37. This ensures that the obtained audio signals used in examples of the disclosure are compatible with legacy loudspeaker players 37.

The third audio rendering device 39 comprises an advanced loudspeaker player 39. The advanced loudspeaker player 39 also enables multi-channel loudspeaker signals to be obtained from the received audio signals where the multi-channel loudspeaker signals are rendered to audible signals by one or more loudspeakers 51 or any other suitable devices. The advanced loudspeaker player 39 also receives information indicative of the layout of the loudspeakers 51. This information may be used to ensure that the spatial properties of the audio signal can be recreated by the loudspeakers 51.

The advanced loudspeaker player 39 differs from the legacy loudspeaker player 37 in that the advanced loudspeaker player 39 is arranged to use the spatial metadata to enable the audio signals to be rendered. The use of the spatial metadata may enable the spatial accuracy of the audible signal to be improved compared to the audible signals provided by the legacy loudspeaker player 37. This may enable an improved listening experience to be provided to the user.

The fourth audio rendering device 41 comprises an advanced binaural player 41. The advanced binaural player 41 also enables binaural signals to be obtained from the received audio signals to be rendered to audible signals by a set of headphones 53 or any other suitable device. In some examples the headphones could be mounted within or coupled to a head mounted display 57 or any other suitable device.

The advanced binaural player 41 differs from the legacy binaural player 35 in that the advanced binaural player 41 is arranged to use the spatial metadata to enable the audio signals to be rendered. The use of the spatial metadata may enable the spatial accuracy of the audible signal to be improved compared to the audible signals provided by the legacy binaural player 35. This may also enable the binaural signals to be adjusted to take into account both a change in the orientation of the users' head and translational movement of the user. The use of the spatial metadata may therefore allow for six degrees of freedom of movement for a user wearing the head mounted display 57 and headphones 53.

In the example system 31 of FIG. 3 four audio rendering devices are shown. It is to be appreciated that other numbers of audio rendering devices could be used in other examples of the disclosure. Also the different types of audio rendering devices are shown in FIG. 3. In implementations of the disclosure only one or more of the different types of audio rendering devices 35, 37, 39, 41 needs to be provided in a single system.

FIG. 4 schematically illustrates an audio recording device 33. The audio recording device 33 comprises a first creator module 61, a second creator module 63, a merger module 65 and an encoding and multiplexing module 67. It is to be appreciated that the audio recording device 33 could comprise additional modules, for example, the audio recording device 33 could comprise more than two creator modules which may be arranged to receive different types of audio signals. In other examples the audio recording device 33 could comprise just one creator module which could be arranged to received audio input signals 34, 36 from one or more microphone arrays 43 or the spatial audio mixer 45.

The first creator module 61 is arranged to receive the input audio signals 34 from the microphone array 43. The microphone array 43 could be any plurality of spatially separated microphones. In some examples the microphone array 43 may comprise a plurality of microphones arranged to have different pick up patterns. For instance, the microphone array 43 could comprise a set of cardioid microphones which may be arranged to provide first order Ambisonic signals. In such examples the cardioid signals may be combined and/or mixed in a specific way to obtain Ambisonic signals. In some examples the microphone array 43 could be provided within a camera or other imaging device. In some examples the microphone array 43 could be provided within a communication device such as a mobile telephone.

The first creator module 61 converts the input audio signals 34 to FOA signals and spatial metadata. Other audio signals could be used instead of FOA signals in other implementations of the disclosure.

The spatial metadata that is generated by the first creator module 61 may comprise data that is relevant to the spatial perception of the audible signals captured by the microphone array 43. The spatial metadata could comprise directional information in frequency bands, direct-to-total ratio information in frequency bands, distance information in frequency bands and/or any other suitable information. The spatial metadata can then be used when the FOA signals are being rendered.

Any suitable processes may be used by the first creator module 61 to obtain the spatial metadata. The spatial metadata may be determined in frequency bands. The frequency bands may involve one or more of the frequency bins from the time-frequency transform. The frequency bands that are used may approximate a frequency resolution that is relevant for human spatial hearing, such as the Bark bands.

As an example, where the microphone array 43 comprises two microphones the delay between the two microphones can be estimated for a range of frequency bands. This can be used to determine an angle within a 180° arc from which the sound arrives at the microphones. In such examples, the delay in frequency bands between the two microphones can be estimated by finding a delay parameter that maximizes the cross-correlation of the microphone signals. In such examples the first microphone output signals may be processed to obtain a first complex-valued time-frequency signal $A(k,n)$ and the second microphone output signals may be processed to obtain a second complex-valued time-frequency signal $B(k,n)$, where k is the frequency bin index (for example the STFT (short time Fourier transform) bin index), and n is the time index of the time-frequency signal. One frequency band b may involve the frequency bins ranging from $k_{b,bottom}$ to $k_{b,top}$. The delay for the frequency band b is found by finding a delay d that maximizes $$d(b, n) = \underset{d}{\arg\max} \sum_{k=k_{b,bottom}}^{k_{b,top}} \operatorname{Re}\{A(k, n)B^*(k, n)e^{i2\pi kd/K}\}$$

where Re is the real-part operator, * is the complex conjugate and K is the FFT (fast Fourier transform) size used in the STFT.

In this example the value of the delay d is determined in samples. The delay providing the maximum correlation can be found by determining the correlation with a set of delays ranging between $-D_{max}$ to $D_{max}$. The maximum delay value $D_{max}$ is determined according to distance between the microphones within the array 43. For example, if $D_{max}$ is exactly the delay value corresponding to the time (in samples) that that it takes for sound to travel the distance between the microphone pair, an angular value corresponding to the delay can be obtained by $$\theta(b, n) = \sin^{-1}\left(\frac{d(k, n)}{D_{max}}\right)$$

In some examples the microphone array 43 could comprise three microphones. For instance a communication device may have two microphones provided on the front of the device and one provided on the rear. This provides a front-back microphone pair which may enable spatial information to be obtain in 360° around the microphone array 43. The first creator module 61 may be arranged to analyse the delays in the signals obtained by the front-back microphone pair to determine if a sound arrives, in general, from the front or the rear of the device.

This front-back determination can be used with the 180° determination described above to provide a 360° determination of the direction of arrival for a sound. For example, if the 180° determination indicates that the sound arrives from 30° degrees left this may initially be assumed to be from the front of the device. The front-back determination may then indicate that the sound arrives from the back of the device. In response to this the angular value of the sound is updated to indicate that the sound arrives from an angle of 150° left.

In some examples the microphone array 43 could comprise four microphones. This may enable information about the elevation of the sound to be determined as well as the 360° determination of the direction of arrival. The elevation of the sound could be determined using any suitable process. In some examples the elevation of the sound could be determined by using a delay determination method using a pair of microphones separated along a vertical axis. This enables the first creator module 61 to obtain information about the sound scene captured by the microphone array 43 in three dimensions. It is to be appreciated that different methods may be used to obtain information about the sound scene. In particular different methods could be used for different devices depending on the arrangements of the microphones and any other suitable factors.

Any suitable methods and processes may be used by the first creator module 61 to obtain the three dimensional information. For instance direct to total ratio estimates may be obtained for frequency bands. The direct to total ratio estimates may be obtained from correlation estimates between the microphones. Fully or strongly directional sounds are coherent between the microphones whereas the ambient components are partially or fully incoherent. The ambient components may be fully or partially incoherent depending on the frequency and the distance between the microphones within the array 43.

Other methods and processes for obtaining the spatial metadata may be used in other examples of the disclosure. For instance, in some examples the spatial metadata may be obtained using Directional Audio Coding (DirAC). Such methods may comprise estimating a sound field intensity vector and the sound field energy based on a B-format microphone signal. The B-format microphone signal could be a variant of a FOA. The method may then comprise enabling the determination of directional and ratio metadata in frequency bands.

In other examples the spatial metadata could be obtained using Harmonic plane wave expansion (Harpex). Such methods may comprise decomposing a B-format microphone signal and using the decomposed signal to determine two simultaneous directions of arrival in frequency bands.

In some examples of the disclosure the spatial metadata comprise distance information as well as directional information. The distance information may comprise information about the distance between a sound source and the microphones within the microphone array 43. Any suitable processes and methods may be used, by the first creator module 61, to obtain the distance information.

In some examples the distance information for a microphone array 43 may be estimated using the fluctuation of the directional parameters. The directional parameter may fluctuate more due to reverberation the further away the sound source is from the microphone array 43.

In other examples the distance information could be obtained using a visual depth map or other visual based detections. In such examples the distance information could be estimated using both the visual depth maps and also the fluctuation of the directional parameters.

In other examples the distance information could be obtained using two or more spatially separate microphone arrays. In such examples the distance information could be obtained using directional estimates from both of the microphone arrays and a vector approach to estimate the position of the sound source.

Once the distance information has been obtained the first creator module 61 may be arranged to express the spatial metadata as direction, ratio and distance parameters in frequency bands.

The spatial metadata may be expressed using any suitable coordinate system. In some examples the spatial metadata may be expressed using a polar coordinate system. In other examples the spatial metadata could be expressed using a Cartesian coordinate system.

In some examples the first creator module 61 may use the spatial metadata to generate the FOA signals. For instance, in some examples the first creator module 61 may use a signal received from a first microphone in the microphone array 43 as a source audio signal. The source audio signal may be pre-processed before being used to generate the FOA signal. The source audio signal may be determined to be the $0^{th}$ order omnidirectional Ambisonic component. The FOA signal, and potentially higher order signals, can be processed adaptively from the $0^{th}$ order omnidirectional Ambisonic component and the obtained spatial metadata.

The $0^{th}$ order omnidirectional Ambisonic component can be divided into a directional part and a non-directional part using gains according to the ratio parameter. The directional part of the FOA and higher order signals can be obtained by applying appropriate gains to the directional part of the $0^{th}$ order omnidirectional Ambisonic component according to the determined direction of arrival. Each spherical harmonic coefficient has a specified non-negative or negative gain towards each direction. For example, $1^{st}$ order Ambisonic gains (which could be expressed as channels Y, Z, X or as ACN channels 1-3) are determined by $Y(\theta, \varphi) = ACN_1(\theta, \varphi) = \sin \theta \cos \varphi$ $Z(\theta, \varphi) = ACN_2(\theta, \varphi) = \sin \varphi$ $X(\theta, \varphi) = ACN_3(\theta, \varphi) = \cos \theta \cos \varphi$ where $\theta$ is the azimuth and $\varphi$ is the elevation. The spatial patterns as a function of $\theta$ and $\varphi$ are defined for all spherical harmonic signals of any order. The non-directional components may correspond to ambient sounds or noise. The non-directional components may be generated by decorrelating the non-directional part of the $0^{th}$ order omnidirectional Ambisonic component and distributing the resulting signals to the spherical harmonic components.

It is to be appreciated that other means for generating the FOA signals could be used in other examples. For instance if the microphone array 43 is provided within a spherical device, such as a Nokia OZO device, the first creator module 61 may be arranged to generate Ambisonic signals or other spherical harmonic signals using linear operations. In such examples some parts of the output signal could be processed adaptively. For instance some frequencies or some orders of the spherical harmonics could be processed adaptively.

The second creator module 63 is arranged to receive the audio signals 36 comprising audio objects. The second creator module 63 converts these input audio signals 34 to FOA signals and spatial metadata.

The second creator module 63 may use any suitable methods to obtain the FOA signals and spatial metadata from the audio input signals 34. In some examples the second creator module 63 may store the input audio signals 34 in the form of audio objects. The audio objects may have a defined direction and defined distance from a reference point. In some examples the input audio signals could be stored as audio channels, which may be considered to be non-moving audio objects. The audio objects may be transformed into FOA signals, or other signals which use spherical harmonics, using appropriate gains. The gains used may be direction dependent spherical harmonic gains and correspond to the defined direction associated with the object. Once the gains have been applied to the audio objects the signals are mixed to provide the FOA output signal.

The second creator module 63 may use any suitable methods and processes to obtain the spatial metadata. In some examples the second creator module 63 may obtain the spatial metadata using a virtual recording. In such examples a virtual recording may be generated at the same time as the FOA signal is generated. The virtual signal may be generated to recreate the signals that would be obtained if a microphone array, or other suitable audio capturing device, was located in the listening position. The processes and methods that are used to generate spatial metadata from the microphone array 43 can then be used on the virtual signal.

In other examples the second creator module 63 may obtain the spatial metadata using information about the energies of the audio objects. In such examples the second creator module 63 monitors the energy of all the audio objects in frequency bands. The direction and distance parameters of the spatial metadata may be obtained from positional information about the audio objects. The direction and distance parameters may be the same for each frequency band. In some examples more than one set of simultaneous direction and distance parameters may be used for one or more audio objects. The direct-to-total energy ratio parameters for each frequency band can be obtained from the estimated relative energies of the audio objects in the frequency band. For instance, if there are three objects, the frequency band energies at a reference position are $E_1$, $E_2$ and $E_3$. The reference position may be a recording position which could be the position for which Ambisonic signals are formulated. The direct-to-total energy parameters for these objects are therefore $$\frac{E_1}{E_1+E_2+E_3}, \frac{E_2}{E_1+E_2+E_3} \text{ and } \frac{E_3}{E_1+E_2+E_3}.$$

The FOA signals and the spatial metadata are provided to the merging module 65. The merging module 65 merges the different FOA signals and the different spatial metadata received from the different creator modules 61, 63 into a single FOA output and a single spatial metadata output. In the example of FIG. 4 the merging module 65 merges two sets of FOA signals and two sets of spatial metadata. It is to be appreciated that the merging module 65 could be used to merge any number of sets of FOA signals and sets of spatial metadata in other examples of the disclosure.

The merging module 65 may use any suitable methods and processes to merge the FOA signals and the spatial metadata. In some examples the FOA signals obtained by the second creator module 63 may be added to the FOA signals obtained by the first creator module 61 by using appropriate gains. The spatial metadata obtained by the second creator module 63 can then be added to the spatial metadata obtained by the first creator module 61.

The adding of spatial metadata may comprise any suitable processes. In some examples the adding of the spatial metadata comprises stacking the direction and distance metadata obtained by each of the creator modules 61, 63. For example the spatial metadata obtained by a first creator module 61 may comprise the simultaneous directions a and b while the spatial metadata obtained by a second creator module 63 may comprise the simultaneous directions, c, d and e. The result spatial metadata provided by the merge module would have simultaneous directions a,b,c,d and e. The directions may be simultaneous in that they occur in the same time-frequency interval.

In some examples the adding of the spatial metadata comprises formulating corresponding energy ratio parameters. The energy ratio parameters obtained by the creator modules 61, 63 were direct-to-total ratio parameters. The new total energy parameters that the merging module 65 uses to formulate the new direct-to total energy ratio parameters may be the sum of the previous total energies.

In other examples the merger modules 65 may receive a first FOA signal from the first creator module 61 and a second FOA signal from the second creator module 63. The merger module 65 may then be arranged to mix the two, or more, FOA signals to create a resulting FOA signal. The merger module 65 could then analyze the resulting FOA signal to determine the spatial metadata. The merger module 65 could use any suitable technique to analyze the FOA signal to determine the spatial metadata. For instance the merger module 65 could use DirAC methods or processes.

The merged FOA signals and spatial metadata are provided to the encoding and multiplexing module 67. The encoding and multiplexing module 67 is arranged to encode the FOA signal and attach the spatial metadata to the encoded signal. In the example of FIG. 4 the encoding and multiplexing module 67 is arranged to perform AAC (advanced audio encoding). Other types of encoding may be used in other examples of the disclosure.

The spatial metadata may be embedded as part of the encoded signal. Before the spatial metadata is embedded the metadata may be quantized and/or coded so as to optimize the bit rate of the data stream.

The encoding and multiplexing module 67 provides a data stream as an output. The data stream comprises the encoded FOA signals and the corresponding spatial metadata.

The encoded FOA signals and the corresponding spatial metadata can be stored and/or transmitted in any suitable media container format. In some examples the encoded FOA signals and the corresponding spatial metadata may be stored using an mp4 container. The spatial metadata may be encoded in the metadata fields of the container. In some examples the media containers could include other data streams. The other data streams could comprise other audio signals or video signals or any other suitable type of data. The video streams could be stereo panoramic video streams or any other suitable type of video streams. The data stream could comprise information which may enable spatial rendering of the video streams. For example, it may contain depth information about the panoramic video stream.

The output data stream of the encoding and multiplexing module 67 is compatible with both legacy media players and also advanced media players. In the example system 31 of FIG. 3 the output data stream is compatible both with the legacy binaural player 35 and the legacy loudspeaker player 37 and also compatible with the advanced loudspeaker player 39 and the advanced binaural player 41.

FIG. 5 schematically illustrates a legacy binaural player 35. The legacy binaural player 35 comprises a decoding module 71 and a binauralizing module 73.

The decoding module 71 is arranged to receive the data stream comprising the encoded FOA signals and the corresponding spatial metadata as an input. In the legacy binaural player 35 the decoding module 71 is arranged to discard the spatial metadata and perform the AAC decoding on only the FOA audio signals.

The decoded FOA signals are then provided as an input to the binauralizing module 73. The binauralizing module 73 is also arranged to receive an input 75 comprising information indicative of a user's head orientation.

The information indicative of the user's head orientation could be received from any suitable device. In some examples the information could be received from a head mounted display 55 or any other suitable type of device.

The binauralizing module 73 is arranged to use the FOA signals and the information indicative of the head orientation to provide binaural signals. The binaural signals could be rendered by the headphones 47. The information indicative of the user's head orientation may be limited to the angular position of the user's head. It might not allow for any positional translation of the user's head. This may allow the binaural signals to be processed and rendered to take into account movement of the user's head in three degrees of freedom (roll, pitch, yaw) but does not account for any translational movement of the user.

FIG. 6 schematically illustrates a legacy loudspeaker player 37. The legacy loudspeaker player 37 comprises a decoding module 81 and a loudspeaker rendering module 83.

The decoding module 81 is arranged to receive the data stream comprising the encoded FOA signals and the corresponding spatial metadata as an input. In legacy loudspeaker player 37 the decoding module 81 is arranged to discard the spatial metadata and perform the AAC decoding on only the FOA audio signals.

The decoded FOA signals are then provided as an input to the loudspeaker rendering module 83. The loudspeaker rendering module 83 is also arranged to receive an input 85 comprising information indicative of the loudspeaker layout.

The loudspeaker rendering module 83 is arranged to use the FOA signals and the information indicative of the loudspeaker layout to provide multichannel loudspeaker signals. The multichannel loudspeaker signals could be rendered by the loudspeakers 49.

FIG. 7 schematically illustrates an advanced binaural player 41. The advanced binaural player 41 comprises a decoding and demultiplexing module 91 and a binauralizing module 93.

The decoding and demultiplexing module 91 is arranged to receive the data stream comprising the encoded FOA signals and the corresponding spatial metadata as an input. The decoding and demultiplexing module 91 is arranged to decode the input data stream and also demultiplex the spatial metadata to a separate stream. The decoding and demultiplexing module 91 therefore provides a first output comprising the decoded FOA signals and second output comprising the spatial metadata.

Both the decoded FOA signals and the spatial metadata are provided as an input to the binauralizing module 93. The binauralizing module 93 is also arranged to receive an input 95 comprising information indicative of a user's head orientation and also the translational position of the user's head.

In this case the information indicative about the user's head orientation and the translational position is not limited to the angular position of the user's head. The information now allows for translation of the user's head. This may allow the binaural signals to be processed and rendered to take into account movement of the user's head in six degrees of freedom (roll, pitch, yaw as well as, left-right, forward-backwards, up-down).

The information indicative of the user's head orientation and translational position could be received from any suitable device. In some examples the information could be received from a head mounted display 57 which is being worn by the user.

In the advanced binaural player 41 the binauralizing module 93 is arranged to use the FOA signals, the spatial metadata and the information indicative of the head orientation and translational position to provide binaural signals. The binaural signals could be rendered by the headphones 47. The use of the spatial metadata may enable the binaural signals to take into account the translational position of the user's head. The use of the spatial metadata may also enable the audio signals to be rendered with improved spatial accuracy compared to the legacy binaural player 35.

FIG. 8 schematically illustrates an advanced loudspeaker player 39. The advanced loudspeaker player 39 comprises a decoding and demultiplexing module 101 and a loudspeaker rendering module 103.

The decoding and demultiplexing module 101 is arranged to receive the data stream comprising the encoded FOA signals and the corresponding spatial metadata as an input. The decoding and demultiplexing module 101 is arranged to decode the input data stream and also demultiplex the spatial metadata to a separate stream. The decoding and demultiplexing module 101 therefore provides a first output comprising the decoded FOA signals and second output comprising the spatial metadata.

Both the decoded FOA signals and the spatial metadata are provided as an input to the loudspeaker rendering module 103. The loudspeaker rendering module 103 is also arranged to receive an input 105 comprising information indicative of the loudspeaker layout.

The loudspeaker rendering module 105 is arranged to use the FOA signals, the spatial metadata and the information indicative of the loudspeaker layout to provide multichannel loudspeaker signals. The multichannel loudspeaker signals could be rendered by the loudspeakers 51. The use of the spatial metadata may enable the audio signals to be rendered with improved spatial accuracy compared to the legacy loudspeaker player 37.

FIG. 9 illustrates a method that may be performed by a legacy binaural player 35. The method may be used to decode received audio signals.

At block 111 the legacy binaural player 35 receives the audio signals. The received audio signals could be FOA signals or higher order Ambisonics signals or any other suitable audio signals. The spatial metadata obtained with the audio signals may be discarded by the legacy binaural player 35. The received audio signals may then be processed linearly.

At block 113 the legacy binaural player 35 receives an input indicative of the user's head orientation. The information indicative of the user's head orientation may be limited to the angular position of the user's head. It might not allow for any translation of the user's head.

At block 115 the received audio signals are rotated corresponding to the user's head orientation. A rotation matrix, or any other suitable process or technique may be used to rotate the audio signals. At block 117 the rotated audio signals are decoded using a matrix of filters which are designed to convert the Ambisonic, or other type of audio signal, to a binaural signal. The matrix is an N to 2 decoding matrix of filters where N is the number of spherical harmonic signals which are converted into two binaural signals.

At block 119 a binaural output is provided. The binaural output may be rendered by the headphones 47 or any other suitable rendering device.

The example method of FIG. 9 shows a time domain implementation of legacy binaural player 35. In other examples time-frequency domain implementations could be used instead.

FIG. 10 illustrates a method that may be performed by a legacy loudspeaker player 37. The method may be used to decode received audio signals.

At block 121 the legacy loudspeaker player 37 receives the audio signals. The received audio signals could be FOA signals or higher order Ambisonics signals or any other suitable audio signals. The spatial metadata obtained with the audio signals may be discarded by the legacy loudspeaker player 37. The received audio signals may then be processed linearly.

At block 123 the received audio signals are decoded using a matrix or a matrix of filters which are designed to convert the Ambisonic, or other type of audio signal, to an output which can be rendered by the loudspeakers 49. The matrix is an N to M decoding matrix where N is the number of spherical harmonic signals in the received audio signal and M is the number of loudspeakers. The matrix may be predesigned according to the positions of the loudspeakers so as to enable spatial audio signals to be rendered.

At block 125 a loudspeaker output is provided. The loudspeaker output may be rendered by the loudspeakers 49 or any other suitable rendering device.

FIG. 11 illustrates a method that may be performed by an advanced binaural player 41. The method comprises decoding received audio signals to provide a binaural output. The advanced binaural player 41 enables the audio signals to be rendered so as to provide spatial audio and allow six degrees of freedom of movement of the user wearing the headphones 53.

At block 131 the advanced binaural player 41 receives the audio signals. The received audio signals could be FOA signals or higher order Ambisonics signals or any other suitable audio signals.

At block 133 the advanced binaural player 41 also receives information indicative of the user's head orientation. The information indicative of the user's head orientation could relate to just the angular position of the user's head. The information indicative of the translational position of the user need not be provided at this point.

At block 135 the advanced binaural player 41 obtains binaural signals using a legacy method. For instance the advanced binaural player 41 uses the FOA signals and the information indicative of the user's head orientation to obtain a binaural signal. The advanced binaural player 41 may rotate the FOA signals using a rotation matrix corresponding to the user's head orientation. The rotated signals may then be decoded using a matrix of FOA-to-binaural filters. This could be similar to the methods performed by the legacy binaural player 35 as described above.

At block 137 the binaural signals are transformed to the frequency domain. Any suitable transformation may be used for this process.

At block 139 the energy in each of the frequency bands is estimated for the binaural signal.

At block 141 the advanced binaural player 41 obtains information indicative of the translational position of the user's head. This information is provided in addition to the information indicative of the orientation of the user's head. This information may enable the spatial audio to be provided with six degrees of freedom.

At block 143 the spatial metadata is obtained. In order to enable six degrees of freedom the spatial metadata comprises distance parameters in addition to directional and energy ratio parameters.

At block 145 the advanced binaural player 41 determines the improved binaural and spectral properties of the binaural signal. The information indicative of the translational position of the user's head, the information indicative of the rotational position of the user's head and the spatial metadata may all be used to enable the improved binaural and spectral properties to be determined.

At block 147 the advanced binaural player 41 adjusts the binaural and spectral properties of the binaural signal. The binaural and spectral properties may be adjusted in frequency bands. The binaural and spectral properties could be adjusted by adjusting the energies, correlations and phase differences of the binaural signals. For instance, if it has been determined, at block 145, that the user has moved closer to a sound source the direct sound corresponding to that source can be amplified at block 147. In this example the adaptive processing could also adjust the inter-aural coherence so that there is a higher coherence as the direct sound would now be more prominent with respect to the ambient sounds. Similarly, if it has been determined, at block 145, that the user has moved further away from a sound source the direct sound corresponding to that source can be attenuated and the inter-aural coherence can be decreased.

At block 149 the updated binaural signals are transformed back into the time domain and at block 151 the binaural output is provided. The binaural output may be rendered by the headphones 53 or any other suitable rendering device.

FIG. 12 illustrates another method that may be performed by an advanced binaural player 41. The method also comprises decoding received audio signals to provide a binaural output.

At block 161 the advanced binaural player 41 receives the audio signals. The received audio signals could be FOA signals, HOA signals or any other suitable audio signals.

At block 163 the received FOA signals are transformed to the frequency domain. Any suitable transformation may be used for this process. At block 165 the energy in each of the frequency bands is estimated for the received FOA signal.

At block 167 the advanced binaural player 41 obtains information indicative of the translational position of the user's head. This information may enable the spatial audio to be provided with six degrees of freedom. At block 169 the spatial metadata is obtained. In order to enable six degrees of freedom the spatial metadata comprises distance parameters in addition to directional and energy ratio parameters.

At block 171 the advanced binaural player 41 determines the improved spectral properties and/or improved HOA and/or improved FOA properties of the received FOA/HOA signal. The information indicative of the translational position of the user's head and the spatial metadata may both be used to enable the improved spectral properties and/or improved HOA and/or improved FOA properties to be determined. This may enable the energies and cross correlations of the spherical harmonic components of the FOA for the user's current position to be determined.

At block 173 the improved FOA properties are used to resynthesize the FOA signal. The resynthesized FOA signal corresponds to the new position of the user's head as defined by the information indicative of the translational position of the user's head. In the resynthesized FOA signal the energies and cross correlations of the spherical harmonic components are corrected to take into account the improved FOA properties as determined at block 171. In some examples the resynthesizing of the FOA signal may comprise increasing the order of the spherical harmonic representation. For instance, the input audio signal could be a FOA but the output signal could be a higher order Ambisonics (HOA) signal. This may provide for higher spatial precision in the rendered audio signal.

At block 175 the resynthesized FOA signal are transformed back into the time domain.

At block 177 the advanced binaural player 41 receives information indicative of the user's head orientation. This information is used, at block 179 to convert the resynthesized FOA signal into a binaural signal. The resynthesized FOA signal could be converted to a binaural signal using any suitable method such as using a rotation matrix followed by decoding using a matrix of FOA-to-binaural filters. This could be similar to the methods performed by the legacy binaural player 35 as described above.

At block 181 the binaural output is provided. The binaural output may be rendered by the headphones 53 or any other suitable rendering device.

The example methods of FIGS. 11 and 12 therefore enable the binaural signals to be rendered which allow for six degrees of freedom of movement. It is to be appreciated that the same or similar methods could also be used to provide improved spatial accuracy in the rendered audio. In some examples, even if the information indicative of the translational position of the user's head is not available, the methods of FIGS. 11 and 12 could be used to obtain the improved spatial accuracy.

FIG. 13 illustrates a method of decoding received audio signals that may be performed by an advanced loudspeaker player 39.

At block 191 the advanced loudspeaker player 39 receives the audio signals. The received audio signals could be FOA signals or higher order Ambisonics signals or any other suitable audio signals.

At block 193 the advanced loudspeaker player 39 obtains intermediate loudspeaker signals using a legacy method. For instance the advanced loudspeaker player 39 decodes the received audio signals using a decoding matrix, which may be as described above. In these intermediate loudspeaker signals the sounds of each source may be spread between a plurality of loudspeakers more than is desired due to the width of the beam patterns obtained using the legacy method.

At block 195 the intermediate loudspeaker signals are converted to the frequency domain. Any suitable transformation may be used to convert the loudspeaker signals to the frequency domain.

At block 197 the advanced loudspeaker player 39 obtains the spatial metadata which contains the energy and directional parameters. At block 199 the spatial metadata is used to post process the intermediate loudspeaker signal. The post processing may be performed in frequency bands.

The post processing of the loudspeaker signal improves the spatial accuracy of the intermediate loudspeaker signal. For instance, if the direction of a sound source is determined, the loudspeaker channels corresponding to other directions can be attenuated. In some examples the post processing may comprise using decorrelating operations to adjust for the inter-channel coherence which may be excessive in a linearly produced loudspeaker signal.

At block 201 the post-processed loudspeaker signal is converted back to the time domain and at block 203 a loudspeaker output is provided. The loudspeaker output may be rendered by the loudspeakers 51 or any other suitable rendering device.

In the example of FIG. 13 the spatial metadata is used to obtain improved spatial accuracy of the loudspeaker signals. In some examples the spatial metadata could be used to provide six degrees of freedom of movement for a user using the loudspeakers. In such examples the position of the user relative to the loudspeakers may be tracked. The panning coefficients, and other parameters, of the loudspeakers can then be adjusted to take into account the position of the user.

FIG. 14 illustrates a method of determining improved binaural and spectral properties in a frequency band. Determining the improved binaural and spectral properties comprises determining, in frequency bands, the energy of both channels, the phase difference between the channels and the correlation between the channels. The method could be performed by an advanced binaural player 41. For example the method could be performed at block 145 of the method of FIG. 11.

At block 211 the advanced binaural player 41 obtains the frequency band energy and, at block 213, the direct-to total energy ratio for a given frequency band. This information may be obtained from the received FOA signals or from the spatial metadata. This information is used, at block 215, to determine the amount of direct energy and the amount of ambient energy for the frequency band.

At block 217 the ambient energy is used to determine the left part of the ambient energy and the right part of the ambient energy and also the cross correlation between the left and right parts. In some examples the left and right ambient energies could be set to be the same as the received ambient energy. The cross correlation could be set according to the pre-determined binaural diffuse field cross-correlation. The cross correlation could be weighted with an ambience energy parameter.

The direct energies obtained at block 215 are used to determine the binaural properties for the direct part of the frequency band. At block 223 the advanced binaural player 41 obtains information indicative of the direction of arrival of sound and the distance of the sound source. At block 225 the advanced binaural player 41 obtains information indicative of the translational position of the user and at block 227 the advanced binaural player 41 obtains information indicative of the rotational position of the user. The advanced binaural player 41 uses the information about the position of the user to determine a new direction of arrival and distance for the sound source. The new distance is used to adjust the direct energy. For example, if the user has moved closer to the sound source then the direct energy is amplified.

At block 221 the new adjusted energies are used to obtain the left part of the direct energy and the right part of the direct energy and also the cross correlation between the left and right parts. The cross correlation of the direct energy is expressed such that the direct parts of the energy are coherent but may have a phase difference according to a HRTF (head related transfer function). The HRTF is determined by the user's head rotation and the direction of arrival of sound. In order to determine the left and right parts of the direct energy the advanced binaural player 41 uses further information. For example, at block 219 the advanced binaural player 41 obtains HRTF data and uses these to determine the direct energies.

At block 229 the left and right parts for both the ambient and direct energies are combined. The cross correlations for both the ambient and direct energies may also be combined. The combinations could be the summation of the respective energies and the respective cross correlations.

At block 231 the improved binaural and spectral properties are provided as an output.

The method of FIG. 14 shows a method of determining the improved binaural and spectral properties for a single frequency band. It is to be appreciated that the method would be repeated for the different frequency bands.

FIG. 15 illustrates a method of adjusting binaural and spectral properties in a frequency band. The method could be performed by an advanced binaural player 41. For example the method could be performed at block 147 of the method of FIG. 11.

At block 241 the legacy frequency band binaural signal is obtained. At block 243 the improved binaural and spectral properties are obtained. The improved binaural and spectral properties may be obtained using the example method of FIG. 14.

At block 245 the improved binaural and spectral properties are used to correct the left and right energies of the legacy frequency band binaural signal. The energies may be corrected using real valued gains to provide the values indicated by the improved binaural and spectral properties.

At block 247 the improved binaural and spectral properties are used to correct the left and right phases of the legacy frequency band binaural signal. The phases may be corrected using unity amplitude complex valued gains to provide the phases indicated by the improved binaural and spectral properties.

At block 249 the improved binaural and spectral properties are used to correct the inter-channel coherence of the legacy frequency band binaural signal. In some examples the inter-channel coherence may be reduced by applying decorrelation to the signal. In some examples the interchannel coherence may be reduced or increased by applying a mixing matrix that cross-mixes the sound to have a higher or lower coherence. The cross-mixing phase may be adjusted to be in phase if the coherence is to be increased and may be adjusted to be the opposite phase if the coherence is to be decreased.

At block 251 the advanced binaural frequency band signal is provided as an output. The advanced binaural signal may allow for six degrees of freedom of movement for a user.

In the example of FIG. 15 the blocks have been shown and described as different blocks. It is to be appreciated that in some examples the blocks could be combined into a different number of blocks including one single block. It is also to be appreciated that the blocks could be performed in an order other than the order shown in FIG. 15.

In the legacy loudspeaker player 37 the spatial accuracy that can be provided is limited by the spread of the direct part of the energy and the excessive coherence of the ambience between the loudspeakers. This is due to the wide beam patterns and low spatial selectivity that is a typical result in conventional Ambisonic reproduction to loudspeakers. However, in the advanced loudspeaker player 39 this can be corrected using the added spatial metadata. FIG. 16 illustrates a method of post-processing loudspeaker signals to correct for this. The method could be performed by an advanced loudspeaker player 39. For example the method could be performed at block 199 of FIG. 13.

At block 261 a legacy frequency band loudspeaker signal is obtained and at block 263 information indicative of the direct to total energy ratio for the frequency band is obtained. The information indicative of the direct to total energy ratio is obtained from the spatial metadata.

At block 265 the information indicative of the direct to total energy ratio is used to divide the legacy frequency band loudspeaker signal into direct and ambient parts. The information indicative of the direct to total energy ratio may provide a gain factor which can be used to divide the legacy loudspeaker signal into the direct part and the ambient part.

At block 267 information indicative of the direction of arrival of the sound source is obtained. The information indicative of the direction of arrival of the sound source may be obtained from the spatial metadata. The information indicative of the direction of arrival is used at block 269 to obtain panning data. At block 271 the panning data is used to correct the energies of the direct part obtained at block 265. Channels and directions that do not correspond to the direction of the arriving sound, according to the spatial metadata, may be attenuated.

At block 273 the ambient part of the energies is corrected by decorrelating the signals to obtain spatial incoherence for the ambient parts of the signal. This creates incoherence between the channels.

At block 275 the adjusted signals are summed together. At block 277 the output of the advanced loudspeaker signal is provided.

In the legacy rendering devices 35, 37 the Ambisonic signals may be reproduced by applying a static matrix or a static matrix of linear filters to the spherical harmonic signals to obtain the desired output. The spherical harmonic signals have certain energies and cross correlations which enable the spatial properties of the sound to be determined. The energies and cross correlations for a frequency band can be expressed within a covariance matrix. The covariance matrix therefore contains the spatial aspects of the Ambisonic signal. The improved spatial properties can therefore be obtained by determining an improved covariance matrix.

FIG. 17 illustrates a method of determining improved first order and higher order audio signal properties in a frequency band using a covariance matrix. The method could be performed by an advanced binaural player 41. For example the method could be performed at block 171 of the method of FIG. 12.

At block 281 the advanced binaural player 41 obtains the frequency band energy and, at block 283, obtains the direct-to-total energy ratio for a given frequency band. The frequency band energy information may be obtained from the received FOA signals. The direct-to-total energy ratio may be obtained from the spatial metadata. This information is used, at block 285, to determine the amount of direct energy and the amount of ambient energy for the frequency band.

At block 287 the ambient energy is used to determine the ambient part of an Ambisonic covariance matrix. The ambient part of the Ambisonic covariance matrix may be determined so that it has only diagonal coefficients corresponding to the ambient energy. The non-diagonal coefficients relate to the cross correlations and can be determined to be zero. This is according to the definition of the spherical harmonic signals which are by definition incoherent in an ideal diffuse field.

The ambient part of the Ambisonic covariance matrix can therefore be expressed as $C_A = AI_A$ where A is the ambient energy and $I_A$ is the diagonal matrix. The diagonal entries in the matrix depend on the applied normalization scheme used for the Ambisonic signals. In one normalization scheme, SN3D normalization, the first diagonal value is 1, the next three first order diagonal values are ⅓, the next five second order diagonal values are ⅕ and so on.

To obtain the direct energy part of the Ambisonic covariance matrix the position of the user relative to the sound source is determined. For, example at block 291 the advanced binaural player 41 obtains information indicative of the direction of arrival of a sound source and the distance of the sound source. At block 293 the advanced binaural player 41 obtains information indicative of the translational position of the user. The advanced binaural player 41 uses the information about the position of the user to determine a new direction and/or a new distance for the sound source in frequency bands.

In the example of FIG. 17 the binaural player 41 obtains information about the translational position of the user. The rotational position of the user could be accounted for using legacy methods, or any other suitable method. In other examples the binaural player 41 could obtain information about the rotational position of the user in addition to the information indicative of the translational position.

The Ambisonic gain patterns corresponding to the new direction are obtained at block 297. The gain functions may be obtained in a vector format or any other suitable format. The gains may be pre-formulated as a look-up table or may be calculated in real time. The gain functions corresponding to the new direction of arrival are used to determine the direct part of the Ambisonic covariance matrix at block 289.

The direct part of the Ambisonic covariance matrix can therefore be expressed as $C_D = D v v^H$ where D is the direct part of the energy, v is a column vector containing the spherical harmonic gains corresponding to the new direction of arrival for the sound, and H is the complex conjugate. The direct part of the energy may be increased or decreased according to the new distance parameter compared to the original distance parameter. The direct part of the energy may be increased if the user has moved closer to the source or decreased if the user has moved further away.

At block 299 the ambient and direct Ambisonic covariance matrices are combined. The Ambisonic covariance matrices may be combined by summing the matrices $C=C_D+C_A$, to obtain a matrix containing the improved HOA/FOA properties.

At block 301 the improved first order and higher order properties of the audio signal are provided as an output. The improved first order and higher order properties may be provided as the matrix C.

FIG. 18 illustrates a method of resynthesizing higher order and first order audio signals. The method of FIG. 18 could be performed by an advanced binaural player 41. For example the method could be performed at block 173 of the method of FIG. 12.

At block 311 the FOA or HOA frequency band signal is obtained. At block 313 the covariance matrix for the input signal is estimated in frequency bands.

At block 317 the improved properties of the FOA or HOA signal are received. These may be received in matrix form which may be as described above. This provides the target covariance matrix. At block 315 the optimized processing matrix is determined.

At block 319 the optimized processing matrix is applied to the received HOA or FOA signal so that, at block 321, an improved HOA or FOA frequency band signal is provided.

It is to be appreciated that the method may comprise blocks that are not shown. For instance in some examples the method could comprise a decorrelation procedure.

The example methods described above can be used in various different applications. In some application a multi-channel audio signal could be obtained by a recording device such as an OZO device. This device could also obtain a video signal. The OZO device may obtain an 8-channel signal. The obtained audio signal can be analyzed to obtaining spatial metadata corresponding to the spatial sound represented by the audio signals. The spatial metadata comprises at least one of: direction parameters, energy ratio parameters as well as distance parameters. The methods described above may be used to encode the signal into an FOA signal which is compatible with legacy devices such as YouTube-360 devices and embedded spatial metadata. The spatial metadata, the encoded FOA signal, and the video signal (in any compatible form) is embedded as part of a media file container. The media file container could be uploaded to be used by legacy systems or could be used by advanced systems. In the advanced systems the decoder uses the spatial metadata to enhance the spatial sound. The spatial sound could be enhanced by providing more accurate spatial sound or by allowing six degrees of freedom of movement or by any suitable method. The legacy systems may discard the spatial metadata and may decode the encoded audio signal using legacy methods.

In another example application the audio signals could be captured by two different microphone arrays. For examples, a first microphone array could be positioned 1 metre above a second microphone array. The microphone arrays could be 8-channel OZO devices or any other suitable type of devices. In such examples the directional estimates from the two microphone arrays may be used to determine the distance parameters of the spatial metadata. The distance parameter could be estimated using two direction vectors from the microphone arrays and finding the nearest intersection points of these vectors. The spatial metadata, which may be any suitable metadata, can then be embedded with the FOA signals. When the FOA signals are decoded for a first rendering context the spatial metadata may be discarded, for instance, if the FOA signals are decoded by a legacy device. If the FOA signals are decoded for a second rendering context the spatial metadata is used to provide enhanced spatial audio, for instance is the FOA signals are decoded by an advanced device. The advanced devices may enable tracking of the user and so, with the enhanced spatial audio, may allow for six degrees of freedom for the user.

In some example applications the audio signals could be captured by one or more microphone arrays and also one or more close up microphones. The close up microphones could be Lavalier microphones or any other suitable type of microphones. The close up microphones may be positioned close to the sound sources. The audio signals obtained from the microphone arrays and the close up microphones can be provided to a digital audio workstation. The spatial metadata associated with the audio signals may also be provided. At the digital workstation the audio signals obtained from the microphone arrays and the close up microphones may be mixed. The mixing may comprise applying equalization, dynamic processing or any other suitable process. The output of the digital audio workstation could be in the format of an audio signal with embedded spatial metadata. The spatial metadata could contain a plurality of different layers. For instance the spatial metadata may contain a layer relating to the directional and distance and energy ratio metadata for the sound captured by the microphone array and a layer relating to the directional and distance and energy ratio metadata for the close up microphone. In other examples the spatial metadata may contain an averaged direction, distance and energy ratio parameter in frequency bands for both the microphone array and the close up microphone. In such examples the direction and distance determine an "averaged" or prominent direction and distance of the mixture in frequency bands. The audio signals may be rendered by legacy devices without using the spatial metadata or may be rendered in advanced device with using the spatial metadata.

Examples of the disclosure therefore provide methods and apparatus which enable advanced spatial audio reproduction but which is still compatible with legacy devices.

In this description the storing of data such as audio signals and spatial metadata may comprise only temporary storing, or it may comprise permanent storing or it may comprise both temporary storing and permanent storing. Temporary storing implies the storing of data such as audio signals and spatial metadata temporarily. This may, for example, occur during sensing or audio capture, occur at a dynamic memory, occur at a buffer such as a circular buffer, a register, a cache or similar. Permanent storing implies that the data representing the audio signals and the spatial metadata is in the form of an addressable data structure that is retrievable from an addressable memory space and can therefore be stored and retrieved until deleted or over-written, although long-term storage may or may not occur.

In this description a sound space refers to an arrangement of sound sources in a three-dimensional space. A sound space may be defined in relation to recording sounds (a recorded sound space) and in relation to rendering sounds (a rendered sound space). The rendered sound space may enable a user to perceive the arrangement of the sound sources as though they have been recreated in a virtual three-dimensional space. The rendered sound space therefore provides a virtual space that enables a user to perceive spatial sound.

In this description a sound scene refers to a representation of the sound space listened to from a particular point of view within the sound space. For example a user may hear different sound scenes as they rotate their head or make other movements which may change their orientation within a sound space.

In this description a sound object refers to a sound source that may be located within the sound space. A source sound object represents a sound source within the sound space. A recorded sound object represents sounds recorded at a particular microphone or position. A rendered sound object represents sounds rendered from a particular position.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
   obtaining audio signals wherein the audio signals represent spatial sound of a sound space and are configured to be used to render spatial audio using linear methods;
   obtaining spatial metadata corresponding to the sound space represented with the audio signals, wherein the spatial metadata comprises metadata associated with respective frequency bands of the audio signals; and
   associating the spatial metadata with the obtained audio signals so that in a first rendering context the obtained audio signals are used to render spatial audio that is determined using at least one of the linear methods and without using the spatial metadata, and in a second rendering context the obtained audio signals are used to render spatial audio using the spatial metadata, wherein using the spatial metadata to process the obtained audio signals comprises, at least:
   using the spatial metadata in response to a movement of a listener to process audio signals that are determined using one or more of the linear methods, and
   determining at least one direct part of the obtained audio signals and at least one ambient part of the obtained audio signals based, at least partially, on the spatial metadata,
   wherein associating the spatial metadata with the obtained audio signals comprises at least one of:
   transmitting the spatial metadata and the obtained audio signals to a rendering device; or
   storing the spatial metadata with the obtained audio signals.

2. A method as claimed in claim 1, wherein the spatial metadata comprises information relating to spatial properties of the sound space represented with the obtained audio signals.

3. A method as claimed in claim 1, wherein the obtained audio signals are configured to at least one of:
   use spherical harmonics to enable spatial information to be rendered;
   comprise Ambisonic signals; or
   be obtained from a plurality of spatially separated microphones.

4. A method as claimed in claim 1, wherein the first or second rendering context comprises one or more of: a type of rendering device being used, the movement of the listener, or a spatial accuracy required during rendering.

5. A method as claimed in claim 1, wherein the spatial metadata is configured to enable processing of the obtained audio signals so as to adjust the rendered audio in response to the movement of the listener, wherein the movement of the listener comprises at least one of: an at least partially rotational movement of the listener, or a nonrotational movement of the listener.

6. A method as claimed in claim 1, wherein the obtained audio signals comprise first order Ambisonics signals, wherein the second rendering context is configured to enable the listener to experience the rendered spatial audio with spatial accuracy while moving with six degrees of freedom in the sound space, wherein the movement of the listener comprises a translational movement of the listener, wherein using the spatial metadata to process the obtained audio signals in the second rendering context is configured to provide, to the listener, a perception of the sound space associated with a location of the sound space that is determined based, at least partially, on the translational movement of the listener.

7. A method as claimed in claim 1, wherein using the spatial metadata to process the obtained audio signals comprises using the spatial metadata in response to a movement of the listener to increase spatial accuracy of the rendered audio signals in relation to the movement of the listener.

8. A method comprising:
   obtaining audio signals wherein the audio signals represent spatial sound of a sound space and are configured to be used to render spatial audio using linear methods;
   obtaining spatial metadata corresponding to the sound space represented with the audio signals, wherein the spatial metadata comprises metadata associated with respective frequency bands of the audio signals, wherein the spatial metadata comprises at least one of: distance parameters, direction parameters, or energy ratio parameters; and associating the spatial metadata with the obtained audio signals so that in a first rendering context the obtained audio signals are used to render spatial audio that is determined using at least one of the linear methods and without using the spatial metadata, and in a second rendering context the obtained audio signals are used to render spatial audio using the spatial metadata, wherein using the spatial metadata to process the obtained audio signals comprises using the spatial metadata in response to a movement of a listener to process audio signals that are determined using one or more of the linear methods, wherein associating the spatial metadata with the obtained audio signals comprises at least one of:

transmitting the spatial metadata and the obtained audio signals to a rendering device; or storing the spatial metadata with the obtained audio signals.

9. A method comprising:

obtaining audio signals wherein the audio signals represent a sound scene and are configured to be used to render spatial audio using linear methods;

obtaining spatial metadata corresponding to the sound scene represented with the audio signals; and associating the spatial metadata with the obtained audio signals so that in a first rendering context the obtained audio signals are used to render spatial audio without using the spatial metadata, and in a second rendering context the obtained audio signals are used to render spatial audio using the spatial metadata, wherein using the spatial metadata to process the obtained audio signals increases the spatial accuracy of the rendered audio signals, wherein associating the spatial metadata with the obtained audio signals comprises at least one of:

transmitting the spatial metadata and the obtained audio signals to a rendering device; or storing the spatial metadata with the obtained audio signals, wherein the spatial metadata comprises information indicating how energy levels in one or more frequency sub-bands of the obtained audio signals have been modified.

10. An apparatus comprising:

processing circuitry; and memory circuitry including computer program code, the memory circuitry and the computer program code configured to, with the processing circuitry, enable the apparatus to:

obtain audio signals wherein the audio signals represent spatial sound of a sound space and are configured to be used to render spatial audio using linear methods;

obtain spatial metadata corresponding to the sound space represented with the audio signals, wherein the spatial metadata comprises metadata associated with respective frequency bands of the audio signals; and associate the spatial metadata with the obtained audio signals so that in a first rendering context the obtained audio signals are used to render spatial audio that is determined using at least one of the linear methods and without using the spatial metadata, and in a second rendering context the obtained audio signals are used to render spatial audio using the spatial metadata, wherein using the spatial metadata to process the obtained audio signals comprises enabling the apparatus to, at least:

use the spatial metadata in response to a movement of a listener to process audio signals that are determined using one or more of the linear methods, and determine at least one direct part of the obtained audio signals and at least one ambient part of the obtained audio signals based, at least partially, on the spatial metadata, wherein associating the spatial metadata with the obtained audio signals comprises enabling the apparatus to at least one of:

transmit the spatial metadata and the obtained audio signals to a rendering device; or store the spatial metadata with the obtained audio signals.

11. An apparatus as claimed in claim 10, wherein the audio signals are configured to be used to render spatial audio in response to at least partially rotational movement of the listener, wherein rendering spatial audio without using the spatial metadata comprises rendering the audio signals using at least a first one of the linear methods, wherein using the spatial metadata to process the obtained audio signals comprises using the spatial metadata in response to, at least, translational movement of the listener.

12. An apparatus as claimed in claim 10, wherein the spatial metadata comprises information relating to spatial properties of the sound space represented with the obtained audio signals.

13. An apparatus as claimed in claim 10, wherein the obtained audio signals are configured to at least one of:

use spherical harmonics to enable spatial information to be rendered;

comprise Ambisonic signals; or be obtained from a plurality of spatially separated microphones.

14. An apparatus as claimed in claim 10, wherein the first or second rendering context comprises one or more of: a type of rendering device being used, the movement of the listener, or a spatial accuracy required during rendering.

15. An apparatus as claimed in claim 10, wherein the spatial metadata is configured to enable processing of the obtained audio signals so as to adjust the rendered audio in response to the movement of the listener.

16. An apparatus as claimed in claim 10, wherein the obtained audio signals comprise first order Ambisonics signals.

17. An apparatus as claimed in claim 10, wherein using the spatial metadata to process the obtained audio signals comprises using the spatial metadata in response to a movement of the listener to increase spatial accuracy of the rendered audio signals in relation to the movement of the listener.

18. An apparatus comprising:

processing circuitry; and memory circuitry including computer program code, the memory circuitry and the computer program code configured to, with the processing circuitry, enable the apparatus to:

obtain audio signals wherein the audio signals represent spatial sound of a sound space and are configured to be used to render spatial audio using linear methods;

obtain spatial metadata corresponding to the sound space represented with the audio signals, wherein the spatial metadata comprises metadata associated with respective frequency bands of the audio signals, wherein the spatial metadata comprises at least one of: distance parameters, direction parameters, or energy ratio parameters; and associate the spatial metadata with the obtained audio signals so that in a first rendering context the obtained audio signals are used to render spatial audio that is determined using at least one of the linear methods and without using the spatial metadata, and in a second rendering context the obtained audio signals are used to render spatial audio using the spatial metadata, wherein using the spatial metadata to process the obtained audio signals comprises using the spatial metadata in response to a movement of a listener to process audio signals that are determined using one or more of the linear methods, wherein associating the spatial metadata with the obtained audio signals comprises enabling the apparatus to at least one of:
 transmit the spatial metadata and the obtained audio signals to a rendering device; or
 store the spatial metadata with the obtained audio signals.

19. An apparatus comprising:
processing circuitry; and
memory circuitry including computer program code, the memory circuitry and the computer program code configured to, with the processing circuitry, enable the apparatus to:
obtain audio signals wherein the audio signals represent a sound scene and are configured to be used to render spatial audio using linear methods;
obtain spatial metadata corresponding to the sound scene represented with the audio signals; and
associate the spatial metadata with the obtained audio signals so that in a first rendering context the obtained audio signals are used to render spatial audio without using the spatial metadata, and in a second rendering context the obtained audio signals are used to render spatial audio using the spatial metadata, wherein using the spatial metadata to process the obtained audio signals increases the spatial accuracy of the rendered audio signals, wherein associating the spatial metadata with the obtained audio signals comprises enabling the apparatus to at least one of:
 transmit the spatial metadata and the obtained audio signals to a rendering device; or
 store the spatial metadata with the obtained audio signals,
wherein the spatial metadata comprises information indicating how energy levels in one or more frequency sub-bands of the obtained audio signals have been modified.

* * * * *